Oct. 21, 1958     L. BURTON ET AL     2,857,302
DECORATIVE LAMINATES
Filed Feb. 16, 1956
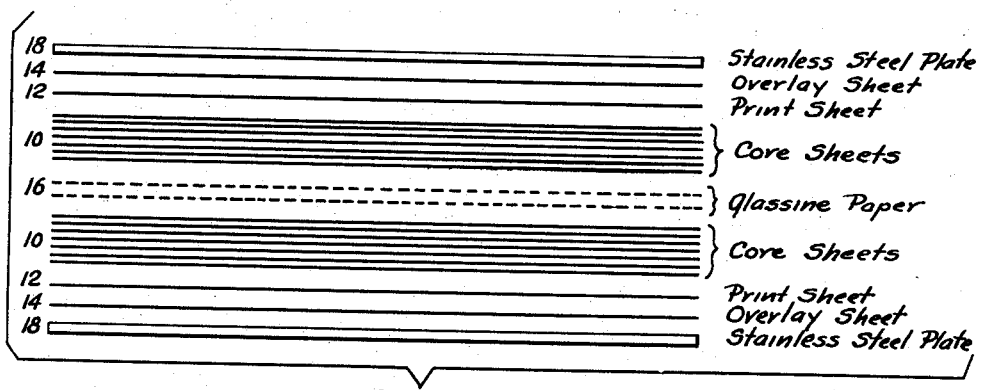
Fig. 1.
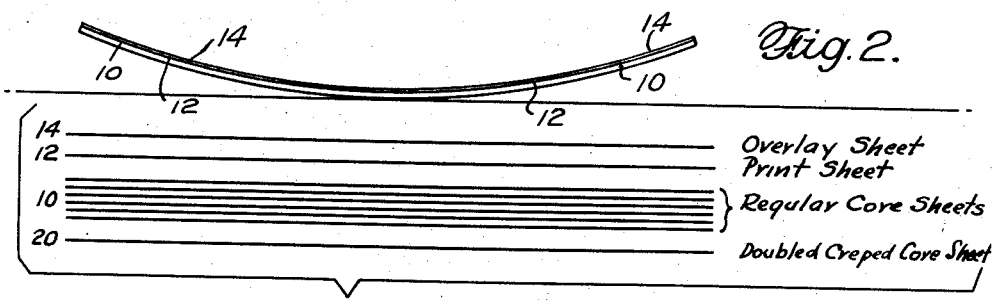
Fig. 2.
Fig. 3.
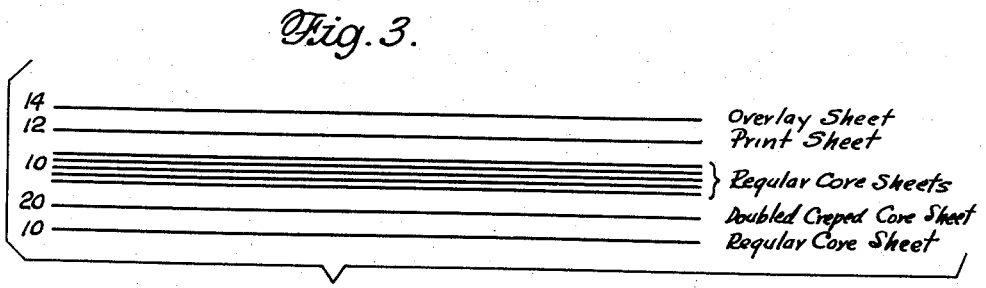
Fig. 4.
Fig. 5.
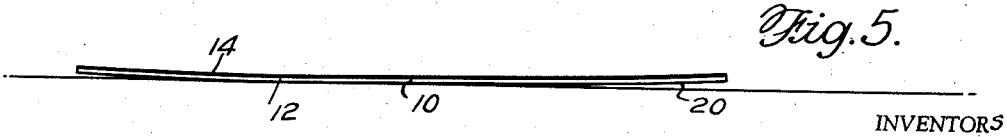
INVENTORS
Leonard Burton
Allan J. Spear
BY Karl W. Flocks
ATTORNEY

United States Patent Office 2,857,302
Patented Oct. 21, 1958

2,857,302

DECORATIVE LAMINATES

Leonard Burton, Linthicum Heights, and Allan I. Spear, Baltimore, Md., assignors to The National Plastic Products Company, Odenton, Md., a corporation of Maryland Application February 16, 1956, Serial No. 565,862

4 Claims. (Cl. 154—45.9)

This invention relates to thermosetting laminates and more particularly to a laminate which is a substantially fully cured thermosetting laminate having a balanced construction in which the tendency to warp has been minimized or eliminated.

This invention is particularly important where the final product is a substantially flat fully cured decorative thermosetting laminate which is to be sold to manufacturers who use the substantially flat sheet to make flat table tops, panels and the like where a flat sheet is required.

Heretofore decorative laminates have been manufactured from a plurality of layers of paper which have been impregnated with various thermosetting resins, and then bonded under heat and pressure until the resins have cured. Such laminates after curing have a tendency to warp and curl. This warp or curvature in the final product is very undesirable.

It is therefore an object of the present invention to provide an improved flat substantially fully cured thermosetting laminate structure that does not warp.

It is a further object of the present invention to provide a method of manufacturing flat substantially fully cured thermosetting laminates which do not have the tendency to warp.

Other objects and the nature and advantages of the instant invention will be apparent from the following description taken in conjunction with the accompanying drawings, wherein:

Fig. 1 is a diagrammatic view of a conventional lay-up arrangement for decorative laminates;

Fig. 2 is a sectional view of a conventional decorative laminate showing the usual warp;

Fig. 3 is a diagrammatic view of an improved decorative laminate in accordance with the present invention;

Fig. 4 is a view similar to Fig. 3 showing a modified form of the invention; and Fig. 5 is a sectional view of the resulting decorative laminate of Fig. 3 in accordance with the present invention.

A high pressure substantially fully cured laminate normally consists of a plurality of sheets of resin impregnated material, such as paper or fabric, that have been bonded together by the application of heat and pressure which acts to fully cure the resin. If the laminate is made to be bonded to another surface for the decoration and protection of that surface, such as a table top, cabinet or wall panel, it is known as a decorative laminate.

The main distinguishing feature between decorative laminates and laminates in general is that the decorative types are normally not homogeneous; since the outer upper sheets are of a different composition than the remaining core sheets and further are impregnated with a different resin.

The usual high pressure decorative laminate, as shown in Fig. 1, is made up of a core of a plurality of sheets of sulphate kraft paper that have been impregnated with a heat reactive phenol-formaldehyde resin, dried and partially cured. The number of core sheets used depends on the desired thickness of the finished laminate and may vary between two sheets for a .022" laminate to as many as twenty sheets for a .250" laminate, depending upon the paper thickness. Most commercial decorative laminates are 1/16" thick and contain about seven or eight core sheets, the exact number depending on the caliper and density of the paper and the laminating pressure. As illustrated in Fig. 1, seven core sheets 10 are shown. Onto the core sheets is placed a print sheet 12 made from an alpha cellulose pulp, and impregnated with a heat reactive melamine-formaldehyde resin, dried and partially cured. The print sheet has been pigmented to yield sufficient opacity to hide the core and is printed with a decorative or functional pattern. An overlay sheet 14 is placed over the print sheet, and is made from an alpha cellulose or rayon pulp and impregnated with a melamine-formaldehyde resin, dried and partially cured. The overlay sheet becomes transparent during the pressing operation. Its function is to provide an abrasion resistant surface for the protection of the pattern on the print sheet.

Before pressing the usual decorative laminate, the above noted sheets are laid up in sandwich form, back to back, separated by two sheets of glassine paper 16 that prevent the laminates from bonding together. Starting from the top, a two-laminate lay-up called a "book" includes an upper stainless steel plate 18, the overlay sheet 14, print sheet 12 and core sheets 10, two sheets of glassine paper 16, core sheets 10, print sheet 12, overlay sheet 14, and a lower stainless steel plate 18. In a commercial operation, the "book" would normally contain six to ten laminates utilizing both one and two-sided stainless steel plates. The "book" is consolidated under heat and pressure for a period of time sufficient to complete the curing of the resins. Molding temperatures of 140° C. for a period of fifty minutes at a pressure of 1500 pounds per square inch have been suggested as satisfactory.

After cooling, the "book" is removed from the press and broken apart. The laminates are removed from between the plates and the glassine paper 16 is sanded off.

It is highly desirable to produce a completely flat laminate; however, decorative laminates, having an unbalanced non-homogeneous structure, as noted heretofore, have a tendency to warp. The warp is greater with the smaller thicknesses of laminate and occurs with the melamine surface on the inside of the warp curve as shown in Fig. 2.

This warp creates serious problems in the handling and further processing of the laminates. When the laminates are sanded, packaged or bonded to a supporting panel, they must be flattened. This flattening stresses the melamine surface and often results in surface cracks and much rejected material.

It has now been discovered that the warp and curvature resulting from the above construction of laminates may be eliminated by substituting a single layer of double creped kraft paper 20 impregnated with phenolic resin for the lowermost sheet or the next to the lowermost sheet of the core sheets previously described. It has been found that when a double creped kraft paper is impregnated with a phenolic resin and is laminated with a plurality of sheets of regular phenolic impregnated kraft core sheets, the resulting laminate has a strong warp with the creped layer on the inside of the warp curve. By incorporating the layer of double creped kraft paper impregnated with phenolic as the under sheet of the conventional decorative laminate, the creped layer acts as a balancing sheet and results in a decorative laminate with significantly less warp than in a corresponding decorative laminate without the creped layer.

In accordance with this invention, a 1/16" decorative laminate with significantly less warp can be made by consolidating an overlay sheet 14 made from an alpha cellulose or rayon pulp and impregnated with a melamine-formaldehyde resin, dried and partially cured, a print sheet 12 made from an alpha cellulose pulp and impregnated with a heat reactive melamine-formaldehyde resin, dried and cured, a core made up of six sheets 10 of sulphate kraft paper that have been impregnated with a heat reactive phenol-formaldehyde resin, dried and partially cured, and a lowermost layer 20 of a double creped kraft paper impregnated with a heat reactive phenol-formaldehyde resin, as shown in Fig. 3.

The laminates can be laid up into books in the normal manner with decorative laminates, separated by sheets of glassine paper. The consolidation of the book between stainless steel plates is accomplished by using heat and pressure in the conventional manner as heretofore described, wherein the resins are fully cured.

After cooling the laminates are removed from between the plates and the glassine paper is sanded off.

In a second example, shown in Fig. 4, the sheet of impregnated double creped kraft paper 20 may be utilized as the next to the lowermost sheet of the core sheets, with a regular impregnated kraft sheet 10 as the lowermost sheet.

The double creped kraft paper is made from plain kraft paper which has been creped diagonally by means of a creping knife followed by a cross creping diagonally at right angles to the initial creping by a second creping knife. The resulting double creped kraft paper can be stretched in every direction. This material is impregnated with the phenolic resin in the usual manner and is dried and partially cured before insertion into the "book." A suitable double creped kraft paper is known as X-crepe, manufactured by Cincinnati Industries, Inc. An example of a patent which discloses the double creped kraft paper and the method and apparatus for manufacturing it is the patent to W. C. Kemp #2,071,347.

To illustrate the reduction of the warp obtained in accordance with the present invention, a number of decorative laminates were made up in the same press cycle using identical materials except that the control laminates had four regular core sheets, whereas the improved balanced laminates had three regular core sheets and one double creped kraft sheet impregnated similarly to the regular core sheets. In both cases, the sheets were 48" wide and .039" in thickness. The results of these tests showed that the balanced laminates had an average warp of .080", as compared to an average warp of 5.75" for the control laminates.

It should be understood that more than one sheet of impregnated double creped kraft can be utilized where desirable.

It is believed that the warping action is caused by the melamine overlay and print sheet having a greater shrinkage during curing than the phenolic core sheets. The balancing action is believed to be due to the double creped phenolic layer having a greater shrinkage than the phenolic core sheets and, therefore, balancing the melamine sheets, thus preventing warp.

This invention is particularly aplicable to thin decorative laminates from .020" to .125" thick, since thicker decorative laminates do not have the tendency to warp.

The present invention has many applications in laminated structures where warp is to be prevented by a balancing action at the lower surface to compensate for the action of the upper surface.

It is known that double creped kraft paper has been previously suggested as being used to replace the kraft core sheets in post-formable laminates. The post-formable laminates made with double creped kraft paper differ from the present invention in that the post-formable laminates are impregnated with special types of resins and special pressing techniques are utilized so that the thermosetting resins are not fully cured so that subsequent bending can be performed. This is to be contrasted with the flat planular substantially fully cured laminates of the present invention, wherein the resins are substantially fully cured. The problems due to warping are not encountered in post-formable laminates.

Hereafter, whenever the term "substantially fully cured laminate" is used, the type of C-stage cure is meant that is well known in the art of making thermosetting laminates in flat sheets as distinguished from those laminates wherein the thermosetting resin is not so fully cured so that the subsequent bending operations can be performed.

It will be obvious to those skilled in the art that various changes may be made without departing from the spirit of the invention and therefore the invention is not limited to what is shown in the drawings and described in the specification but only as indicated in the appended claims.

What is claimed is:

1. A substantially fully cured planular laminated article having plane upper and lower surfaces comprising at least one top surface sheet of cellulosic fibrous material impreganted with a melamine resin, a plurality of core sheets of cellulosic fibrous material impregnated with a phenolic resin, and at least one lower sheet of double creped cellulosic fibrous material impregnated with a phenolic resin.

2. A laminated article in accordance with claim 1 wherein said article contains a lowermost sheet of cellulosic fibrous material impregnated with a phenolic resin.

3. A substantially fully cured planular decorative laminated article having plane upper and lower surfaces comprising a top surface overlay sheet of cellulosic fibrous material impregnated with a melamine resin, a print sheet of cellulosic fibrous material impregnated with a melamine resin, said print sheet having a decorative pattern thereon, a plurality of core sheets of cellulosic fibrous material impregnated with a phenolic resin, and at least one lower sheet of double creped cellulosic fibrous material impregnated with a phenolic resin.

4. A decorative laminated article in accordance with claim 3, wherein said article contains a lowermost sheet of cellulosic fibrous material impregnated with a phenolic resin.

References Cited in the file of this patent

UNITED STATES PATENTS

| 2,304,123 | Rowe | Dec. 8, 1942 |
| 2,343,930 | Rowe | Mar. 14, 1944 |
| 2,801,198 | Morris et al. | July 30, 1957 |

OTHER REFERENCES

"Laminating With Melamine Resins," Noble; Plastics; December 1946; pp. 46, 48, 49, 94 and 95.